Patented Mar. 8, 1932

1,849,030

UNITED STATES PATENT OFFICE

LEIDY D. ZERN AND RICHARD C. MUNKWITZ, OF COLLEGE PARK, MARYLAND, DEDICATED, BY MESNE ASSIGNMENTS, TO THE CITIZENS OF THE UNITED STATES OF AMERICA

PROCESS OF MAKING CHOCOLATE MILK WITHOUT SEDIMENTATION

No Drawing.  Application filed March 14, 1930.  Serial No. 435,951.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes, or any person in the United States without payment to us of any royalty thereon.

Our invention relates to a process of preparing chocolate milk without sedimentation by the liberation of flavor and color without the use of hydrolytic agents.

The object of our invention is to provide a simple process, easy of application, which will obviate the disadvantages of the present processes as hereinafter particularized. We have found that by the use of cocoa in our process, a cheaper product can be manufactured than by the use of chocolate.

Chocolate milk, when first placed on the market, developed a very dark cream layer, due to some of the cocoa particles adhering to the fat globules. There was also a very dark layer on the bottom of the bottle, caused by some of the cocoa settling out. The milk between the two dark layers were very light, and this variation in color made a very undesirable appearance.

It is definitely known that the use of a viscolizer or homogenizer disperses the cream layer. However, the dark sedimentation at the bottom of the bottle caused considerable trouble, as each bottle had to be shaken before using, so that the full benefit of the cocoa could be realized. Due to improper mixing, much flavoring is lost. Furthermore, much difficulty is encountered in washing the bottles to remove the sediment, especially after they have become exposed to atmospheric conditions for several hours, during which time the casein and cocoa has time to dry.

Even though the finished product is made from cocoa, it meets the standard of a chocolate milk, because the cocoa fat is reincorporated into the milk and syrup to complete the process. Cocoa fat does not add flavor, but it does carry flavor which adds smoothness and uniformity to the finished product.

To accomplish our process, we have found that the most complete and satisfactory separation of color and flavor from the cocoa was obtained by adding sugar to the cocoa before stirring it into boiling water. This mixture was prepared in a double boiler. The proportion of sugar finally used was determined by the taste of the finished product. After many trials, the formula we finally selected consists of five and one-half quarts of water, three pounds of sugar and one-half pound of cocoa. This gave weight ratio of 11:3:.5 or approximately one ounce of cocoa to 900 cc. of water. After thoroughly mixing these ingredients, the water was again heated to the boiling point and allowed to stand overnight. By this method a good separation occurred, the fibrous material going to the bottom and the cocoa fat forming a white layer on top which was easily removed. The middle layer of liquid was then siphoned off. This liquid was dark brown in color and had a bitter cocoa flavor. The amount of liquid siphoned off constitutes about three-fifths of the entire mixture, or approximately three quarts.

A palatable drink was made by adding 30 cc. of liquid extract to 100 cc. of pasteurized whole milk. This ratio of extract to milk, we have found to be most desirable. It not only makes a palatable drink, but one with uniform dark brown color and a rich cocoa flavor.

We have found that the extract in this dilution would require considerable storage space, and its consistency was not conducive to its preservation. We, therefore, condensed it and found that a 3 to 1 ratio was most desirable and satisfactory. The consistence derived from this condensation was best for mixing the syrup with the milk. Condensing the extract to a 3 to 1 ratio presented no condensing difficulties and the sugar ratio in the condensed form was sufficient to preserve the syrup. When this syrup is added to milk and is then pasteurized at 180° F. for twenty minutes, the chocolate milk made by this process can be preserved, when placed in sterilized, air-tight containers, for approximately two weeks. While 30 cc. of the original extract added to 100 cc. of milk made a palatable product, we found that only 10 cc. of the condensed (3 to 1) syrup was required in a like quantity of milk to produce an identical chocolate milk.

By the use of our process we have discovered that we can liberate sugars found in the cocoa, thereby reducing the amount of granulated sugar added.

We have also found that the residue after extraction still contains some flavor and color. This residue we utilized by adding it to a mix to make a mild chocolate ice cream. We have also found that it may be utilized in the preparation of chocolate candy. The ice cream and candy made from this residue were both smooth and palatable.

We claim:

1. The herein-described process of making chocolate milk without sedimentation, which comprises mixing sugar and cocoa before stirring it into water that has been brought to boiling; heating the aqueous mixture to boiling; allowing the mixture to stand a length of time sufficient to permit the dispersed ingredients to coagulate; separating the syrup formed between the fat on the surface of the mixture and the fibrous sedimentation on the bottom; adding the syrup to milk and heating.

2. The herein-described process of making chocolate milk without sedimentation, which comprises mixing six parts of sugar to one part of cocoa before stirring into thirty parts of water that has been brought to a temperature of not less than 212° F.; heating the mixture to a temperature of not less than 212° F.; allowing the mixture to stand a length of time sufficient to permit the dispersed ingredients to coagulate; separating the syrup formed between the cocoa fat on the surface of the mixture and the fibrous sedimentation on the bottom; adding the syrup in proportion of one part syrup to three parts of milk and heating at a temperature of not less than 180° F. for a period of not less than twenty minutes.

3. The herein-described process of separating color and flavor from cocoa, which comprises adding sugar to cocoa before stirring it into boiling water; thoroughly mixing these ingredients and heating to a boiling point; allowing the mixture to stand a length of time sufficient to permit the dispersed ingredients to coagulate; separating the syrup formed between the fat on the surface of the mixture and the fibrous sedimentation at the bottom.

LEIDY D. ZERN.
RICHARD C. MUNKWITZ.